July 14, 1925.
O. A. CAVINS
FLUID METER
Filed Oct. 27, 1920
1,546,200
2 Sheets-Sheet 1
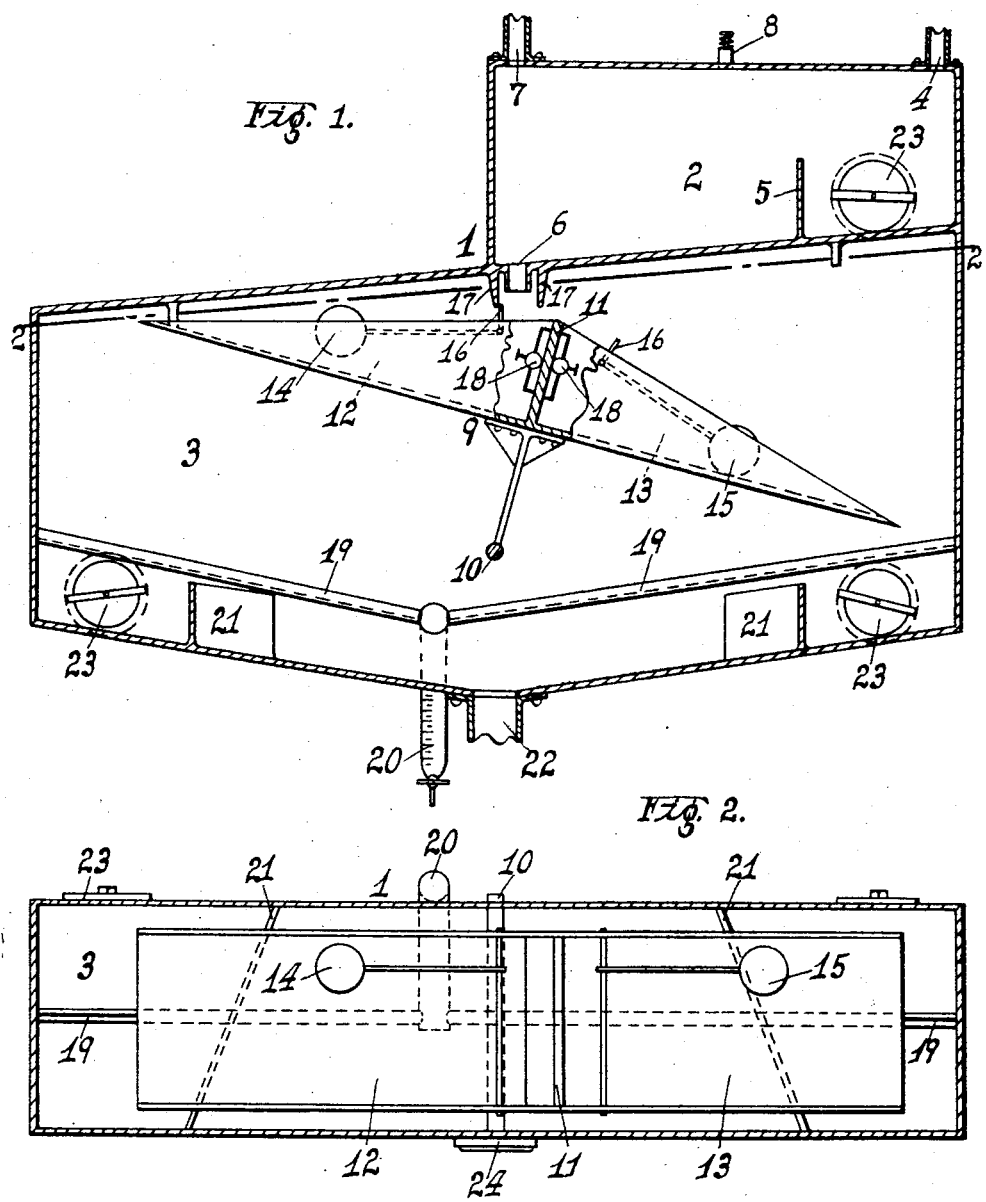
Inventor
Omar A. Cavins.
By Harry C. Schroeder
Attorney July 14, 1925.
O. A. CAVINS
FLUID METER
Filed Oct. 27, 1920 2 Sheets-Sheet 2
1,546,200
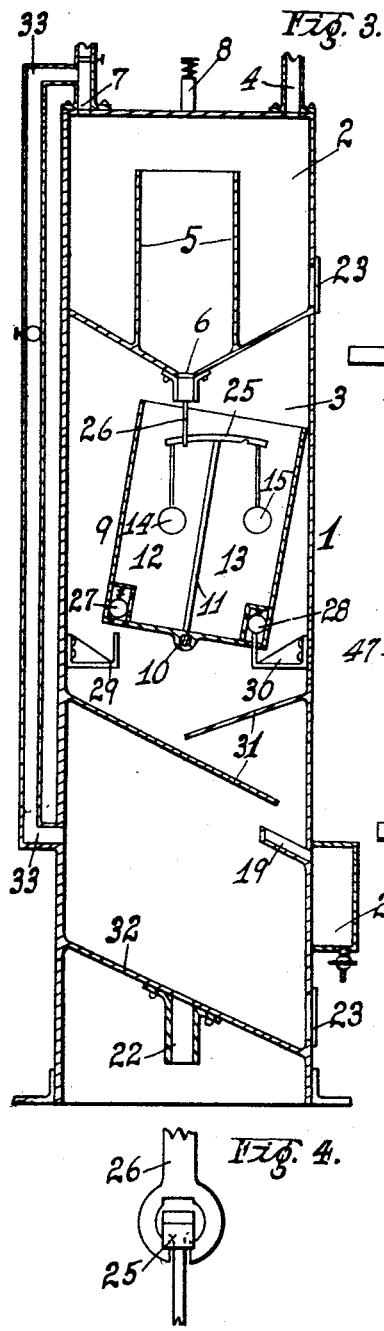
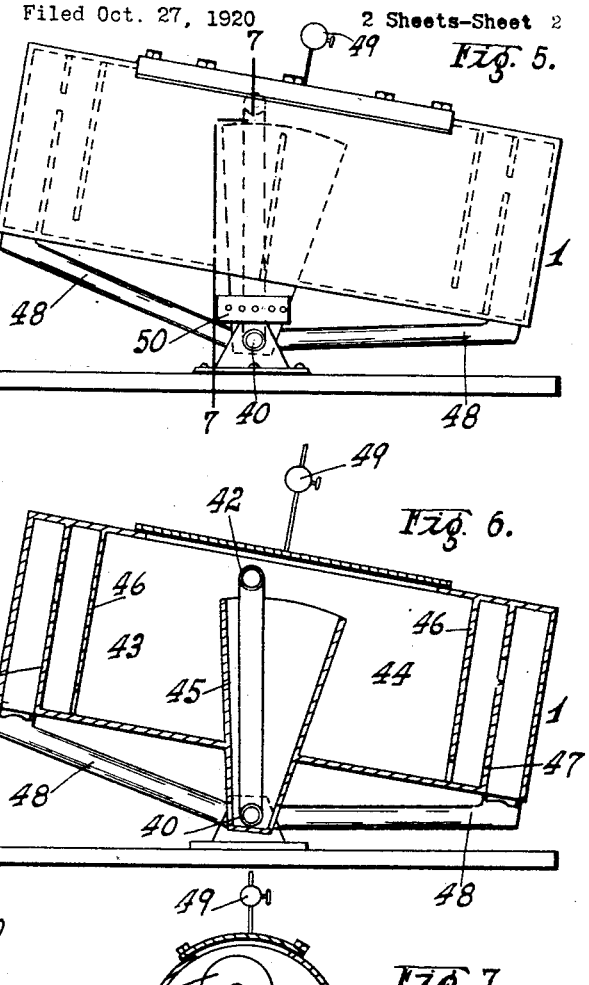
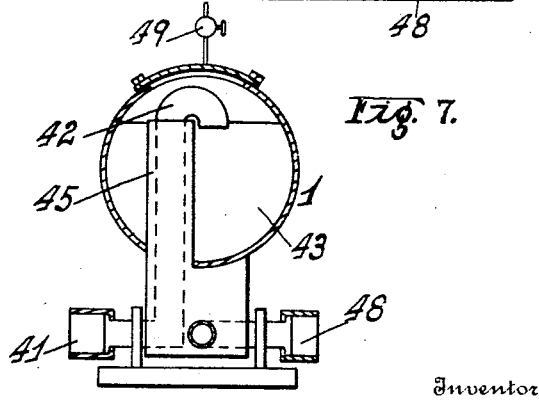
Inventor
Omar A. Cavins.
By Harry C. Schroeder
Attorney Patented July 14, 1925.

1,546,200

UNITED STATES PATENT OFFICE.

OMAR A. CAVINS, OF SAN FRANCISCO, CALIFORNIA.

FLUID METER.

Application filed October 27, 1920. Serial No. 419,962.

*To all whom it may concern:*

Be it known that I, OMAR A. CAVINS, a citizen of the United States, residing at San Francisco, in the county of San Francisco and State of California, have invented certain new and useful Improvements in Fluid Meters, of which the following is a specification.

This invention relates to liquid meters, and more particularly to those adapted to measure the flow of a gas producing oil well.

The present practice in the oil industry is to direct the output of several wells into a single reservoir, thus making it impossible to accurately determine the output of any one well.

One object of my invention is to provide a simple and inexpensive device which may be attached to oil wells to accurately determine their output.

Another object is to obtain a sample of each load in the meter throughout the day, which gives a very accurate sample of the output of the well.

Referring to the drawing which forms a part of this specification:

Figure 1 is a vertical sectional view of my liquid meter.

Figure 2 is a sectional view taken on the line 2—2 of Figure 1.

Figure 3 is a vertical sectional view of a modified form of my invention.

Figure 4 is an enlarged fragmentary view of the float release.

Figure 5 is a side view of a further modification of my invention.

Figure 6 is a vertical section of the same.

Figure 7 is a sectional view taken on the line 7—7 of Figure 5.

In the drawing, in which the same reference numerals apply to the same part throughout, the numeral 1 indicates a meter box which may be either cylindrical or square, and which comprises an intake chamber 2 and a measuring chamber 3. The liquid enters the intake chamber 2 through a port 4, and falls back of a wall 5 which forms a sand trap. The liquid flows over the wall 5 and out through a port 6. The gas may be drawn off through a port 7. A valve 8 in the chamber 2 releases pressure in excess of that for which the valve is adjusted.

The liquid as it flows through the port 6 falls into an oscillating measuring receptacle 9. The receptacle 9 oscillates on a shaft 10 which is journaled in the walls of the measuring chamber 3. A central wall 11 divides the receptacle 9 into two equal compartments 12 and 13. Floats 14 and 15 are hinged in the compartments 12 and 13 respectively, and carry triggers 16 which engage lips 17. As the liquid forces the float upward the trigger 16 disengages the lip 17 and the receptacle swings so as to bring the other compartment under the port 6 and allows the first compartment to be emptied. Weights 18 on the central wall 11 may be adjusted so as to change the center of gravity of the receptacle 9.

As the liquid flows from the compartments 12 or 13, a small portion is caught in the trough 19, which communicates with a suitable sump 20, where it may be withdrawn for testing. The remainder flows back of a wall 21, where any sand is deposited, and then out of the outlet 22. Hand holes 23 allow of the removal of accumulated sand. A counter 24 on the shaft 10 records the number of oscillations of the receptacle 9. Knowing the number of oscillations of the receptacle and its capacity, it is a simple problem to compute the output.

In Figure 3 the receptacle 9 is released by the floats 14 or 15 raising the arm 25 to clear a pin 26 depending from the lower wall of the chamber 2.

Valves 27 and 28 in the compartments 12 and 13 respectively, are adapted to be opened by pins 29 and 30, secured to the wall of the chamber 3.

The liquid flows upon inclined plates 31 which spread it into a flat sheet, and drops into a second inclined plate 32 which contains the outlet 22. A bypass 33 allows the gas to bypass the measuring chamber if it is not desired to remove it at 7.

In the modified form of my invention shown in Figures 5 to 7 inclusive, the entire meter is allowed to oscillate on a shaft 40. This enables a person seeing the meter from a considerable distance to ascertain whether the meter is functioning or not.

The liquid enters the meter through an intake 41 and flows upward through a stand pipe 42 which delivers it to either of the chambers 43 or 44. A wall 45 surrounds the pipe 42 and prevents the liquid from flowing directly and immediately into the outlet 48 instead of syphoning as later described.

In the end of each of the chambers 43 and 44 is a wall 46 having an opening in the bottom thereof. Spaced a small distance back of the wall 46 is a second wall 47 having openings near the top thereof which communicate with outlet pipes 48. An adjustable weight 49 regulates the center of gravity of the meter 1. A counter 50 records the number of oscillations of the meter.

The operation of the meter is as follows: The liquid enters the compartment 43 or 44 and due to the tilted position it cannot flow out of the opening in the wall 47. When a sufficient quantity has entered the compartment to oscillate the meter, the loaded end of the meter will drop, the liquid will cover the port in the wall 47 and flow into the outlet 48. A siphon is produced which exhausts the liquid from the compartment.

Having described my invention, I claim:

1. In a liquid meter, a chamber having an inlet and an outlet, a sand trap between said inlet and outlet, an oscillating chamber of known volume located beneath the said outlet, said oscillating chamber being divided into two compartments, a float in each of the compartments, and means operated by said floats whereby the oscillating chamber is permitted to oscillate when either of said compartments has received a predetermined amount of liquid.

2. In a liquid meter, a chamber having an inlet and an outlet, a sand trap between said inlet and outlet, an oscillating chamber of known volume located beneath the said outlet, said oscillating chamber being divided into two compartments, a float in each of the compartments, means operated by said floats whereby the oscillating chamber is permitted to oscillate when either of said compartments has received a predetermined amount of liquid, and valves located in the bottom of each compartment to release the liquid therein after one of the compartments in said oscillating chamber has been filled.

3. In a liquid meter, comprising an inlet chamber having inlet and outlet ports, a measuring chamber having an outlet, an oscillating double compartmental receptacle pivoted in the last mentioned chamber under the outlet of the first mentioned chamber, said oscillating receptacle having an outlet valve in each compartment thereof, a float in each compartment adapted to operate a trigger whereby the receptacle is released to operate on its axis, a sump adapted to receive a portion of the liquid discharged from the oscillating receptacle, and means whereby a sample may be withdrawn from said sump for testing purposes.

4. In a liquid meter comprising an inlet chamber having inlet and outlet ports, means to relieve the gases liberated in said inlet chamber, a measuring chamber having an outlet, a by-pass connecting said measuring chamber with said inlet chamber, an oscillating double compartmental receptacle pivoted in the measuring chamber under the outlet to the first mentioned chamber, said oscillating receptacle having an outlet valve in each compartment thereof, a float in each compartment adapted to operate a trigger whereby the receptacle is released to oscillate on its axis.

5. In a liquid meter comprising an inlet chamber having inlet and outlet ports, a sand trap between said ports, a measuring chamber having an outlet, an oscillating double compartmental receptacle pivoted in the last mentioned chamber under the outlet to the first mentioned chamber, a float in each compartment adapted to operate a trigger whereby the receptacle is released to oscillate on its axis, a valve in each compartment, a pin mounted below each of the valves adapted to open the valve when the filled side swings downwardly.

In testimony whereof I affix my signature.

OMAR A. CAVINS.